United States Patent
Kurosawa et al.

[11] Patent Number: 6,144,725
[45] Date of Patent: Nov. 7, 2000

[54] DATA RADIO COMMUNICATION APPARATUS AND SYSTEM

[75] Inventors: Yuji Kurosawa, Kawasaki; Shingo Isozaki, Suwa, both of Japan

[73] Assignee: Canon Kabushiki Kaisha, Tokyo, Japan

[21] Appl. No.: 09/007,180

[22] Filed: Jan. 14, 1998

Related U.S. Application Data

[60] Continuation of application No. 08/442,763, May 17, 1995, abandoned, which is a division of application No. 08/428,791, Apr. 24, 1995, abandoned, which is a continuation of application No. 08/110,837, Aug. 24, 1993, abandoned, which is a continuation of application No. 07/734,955, Jul. 24, 1991, abandoned.

[30] Foreign Application Priority Data

Jul. 26, 1990 [JP] Japan ................................. 2-198255
Feb. 6, 1991 [JP] Japan ................................. 3-015348

[51] Int. Cl.⁷ ............................................. H04M 11/00
[52] U.S. Cl. ...................................... 379/100.05; 358/441
[58] Field of Search ......................... 379/100.05, 100.01, 379/100.06; 358/404, 441, 442, 443, 444, 468; 455/557, 556, 343, 344, 345

[56] References Cited

U.S. PATENT DOCUMENTS 4,914,716   4/1990   Takahashi ................................. 455/343

FOREIGN PATENT DOCUMENTS 63-59463   4/1988   Japan .

Primary Examiner—Stella Woo
Attorney, Agent, or Firm—Fitzpatrick, Cella, Harper & Scinto

[57] ABSTRACT

A radio communication apparatus includes a radio communication device for performing data communication via a radio network, and a wire communication device for performing data communication via a wire network. The radio communication device performs data communication at a speed lower than a data communication speed by the wire communication device and monitors the remaining capacity of a battery while performing recording.

17 Claims, 9 Drawing Sheets

DATA RADIO COMMUNICATION APPARATUS AND SYSTEM

This application is a continuation Ser. No. 08/442,763 filed May 17, 1995, now abandoned, which is a division of Ser. No. 08/428,791 filed Apr. 24, 1995 now abandoned, which is a continuation of Ser. No. 08/110,837 filed Aug. 24, 1993 now abandoned, which is a continuation of Ser. No. 07/734,955 filed Jul. 24, 1991, now abandoned.

BACKGROUND OF THE INVENTION

1. Field of the Invention

This invention relates to a data radio communication apparatus which performs communication via a radio network or a wire network.

2. Description of the Related Art

There has been known a cordless facsimile apparatus which performs cordless communication between a sub-apparatus and a host apparatus, and performs wire communication from the host apparatus to the outside.

In such a conventional cordless facsimile apparatus, the transmission speed between the sub-apparatus and the host apparatus is equal to the transmission speed from the host apparatus to the outside.

That is, in the conventional apparatus, data are transmitted at a low speed corresponding to the transmission speed of cordless communication from the host apparatus to the outside. Hence, a long communication time is needed, increasing the tariff for the use of a line. Moreover, the conventional apparatus has the disadvantage that a line is occupied for a long time period, and hence cannot be used for other purposes.

The conventional apparatus also has the disadvantage that, when a facsimile apparatus, serving as the sub-apparatus, is operated by a battery, the reception operation stops if the charged capacity of the battery expires during reception, and an image in the course of reception cannot be normally received.

Another disadvantage of the conventional apparatus is that the operator may be unaware that reception has been interrupted in the course of reception.

SUMMARY OF THE INVENTION

It is an object of the present invention to improve a data radio communication apparatus.

It is a further object of the present invention to shorten an occupied time of a wire line by a data radio communication apparatus for the purpose of data communication.

It is a still further object of the present invention to economize the communication tariff of a data wire communication apparatus.

It is still another object of the present invention to increase the reliability of a data communication apparatus.

It is still a further object of the present invention to provide a countermeasure against a decrease of the capacity of a battery.

It is still another object of the present invention to provide a data communication apparatus which can receive data even if the capacity of an associated battery decreases.

It is still another object of the present invention to provide a data radio communication apparatus which provides notification either in a host apparatus or in a sub-apparatus that the remaining capacity of a battery is small during data reception and recording.

These and other objects and features of the present invention will become more apparent from the following description of the preferred embodiments.

DETAILED DESCRIPTION OF THE PREFERRED EMBODIMENTS

Figure 1:
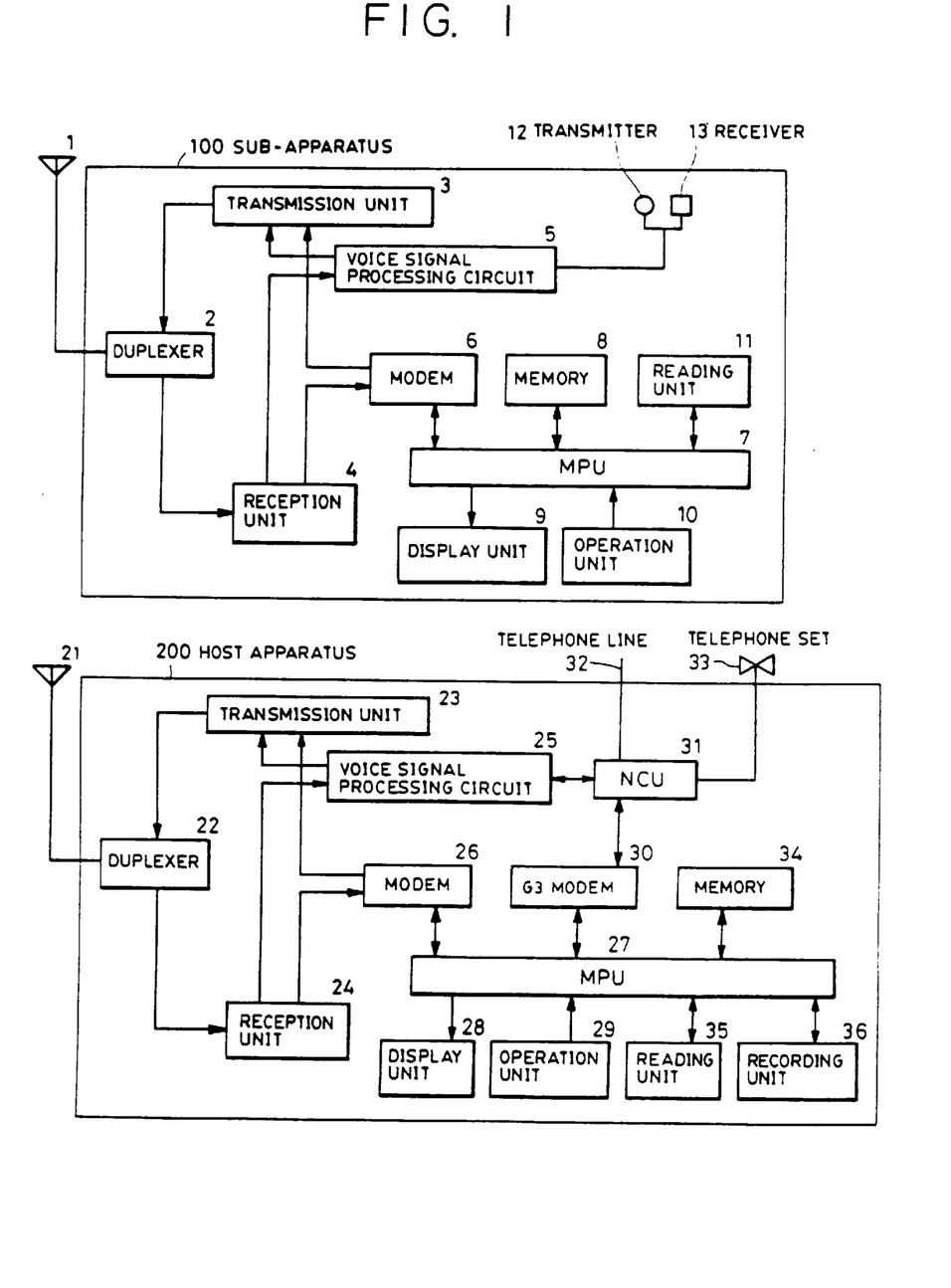
FIG. 1 is a block diagram showing the configuration of a first embodiment of the present invention.

FIG. 1 shows the configuration of a first embodiment of the present invention.

In the present embodiment, data are subjected to radio transmission at a low speed from a sub-apparatus to a host apparatus. After first storing the data received from the sub-apparatus, the host apparatus performs radio transmission of the data at a high speed.

In the present embodiment, communication and conversation are performed between a sub-apparatus 100 and a host apparatus 200 using radio waves.

The sub-apparatus 100 can perform normal conversation using a transmitter 12 and a receiver 13, and has the functions of a facsimile transmitter. That is, the sub-apparatus 100 can transmit data from a reading unit 11 via an antenna 1.

The host apparatus 200 performs conversation and communication with the sub-apparatus 100, and has the functions of a facsimile apparatus, such as transmission, reception, copying, conversation and the like.

In FIG. 1, the sub-apparatus 100 includes the antenna 1, a duplexer 2 for transmitting and receiving radio waves, a transmission unit 3 for transmitting a voice or data signal, a reception unit 4 for receiving a voice or data signal, a voice signal processing circuit 5 for processing a voice signal, a modulator-demodulator circuit (modem) 6 for modulating and demodulating a data signal for radio communication, a reading unit 11 for reading an original, a display unit 9, such as an LCD (liquid-crystal display) or the like, for performing various kinds of display, and an operation unit 10 having function keys and a ten-key.

The sub-apparatus 100 also includes an MPU (microprocessor unit) 7 for controlling the operation of the sub-apparatus 100 itself, and a memory 8, comprising a buffer for temporarily storing data from the reading unit 11, a ROM (read-only memory) for storing programs of the MPU 7, a RAM (random acess memory), serving as a work area of the MPU 7, and the like.

The sub-apparatus 100 further includes the transmitter 12 and the receiver 13.

The host apparatus 200 includes an antenna 21, a duplexer 22 for transmitting and receiving a radio wave, a transmission unit 23 for transmitting a voice or data signal, a reception unit 24 for receiving a voice or data signal, a voice signal processing circuit 25 for processing a voice signal, a modulator-demodulator circuit (modem) 26 for modulating and demodulating a data signal for radio communication, an MPU 27 for controlling the host apparatus 200, a display unit 28 for performing various kinds of display, an operation unit 29 having various kinds of function keys and a ten-key, a G3 modem 30 for performing facsimile transmission/reception, a network control unit (NCU) 31 for controlling a telephone line 32, a built-in telephone set 33, a memory 34 comprising an image memory for storing image data from the sub-apparatus 100, a ROM, a RAN for control, and the like, a reading unit 35 for reading the image of an original, and a recording unit 36 for outputting a received image.

An explanation will now be provided of the operation in the above-described apparatuses.

First, picture data received from the telephone line 32 is demodulated by the modem 30 via the NCU 31, decoded by MPU 27, and recorded on paper by the recording unit 36.

In facsimile transmission from the host apparatus 200, picture data obtained from the reading unit 35 are encoded by the MPU 27, modulated by the modem 30, and transmitted to the telephone line 32 from the NCU 31.

Conversation between the sub-apparatus 100 and the host apparatus 200 is performed according to an MCA (multichannel access) method by the host apparatus 200. That is, the MPU 27 of the host apparatus 200 detects an empty channel, modulates a predetermined code by the modem 26, and transmits the modulated code from the antenna 21 via the transmitter 23 and the duplexer 22. The sub-apparatus 100 detects the predetermined code by the MPU 7 via the antenna 1, the duplexer 2, the receiving unit 4 and the modem 6, and retransmits the predetermined code via the modem 6, the transmission unit 3, the duplexer 2 and the antenna 1. The host apparatus 200 detects the transmitted code by the MPU 27 via the antenna 21, the duplexer 22, the reception unit 24 and the modem 26, and enters in a conversation or communication mode.

Communication or conversation is determined by a predetermined code signal transmitted from the host apparatus 200.

An explanation has been provided of an access from the host apparatus 200 to the sub-apparatus 100. An access from the sub-apparatus 100 to the host apparatus 200 may be performed using the reversed flow.

Figure 2:
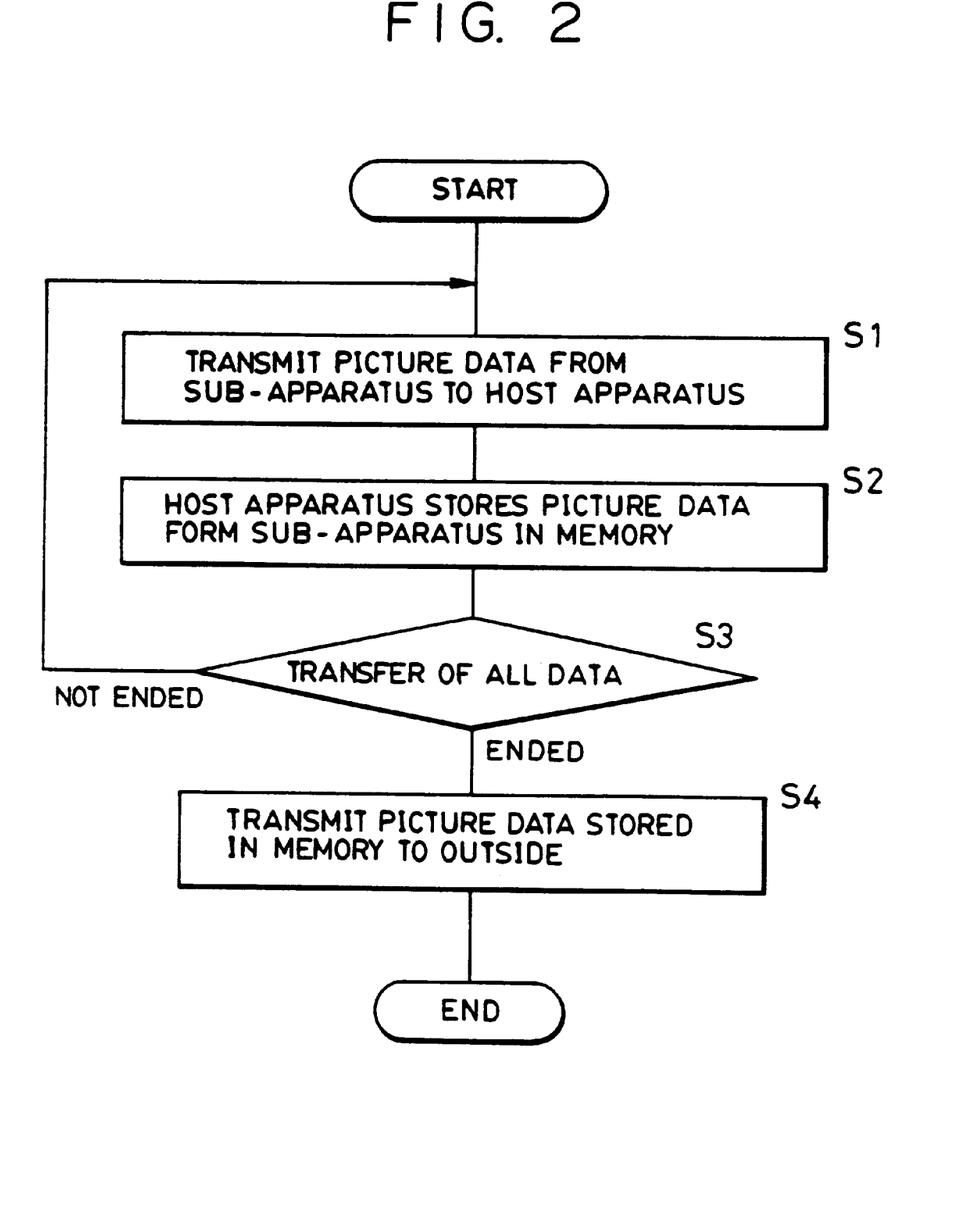
FIG. 2 is a flowchart showing the basic operation of the first embodiment.

FIG. 2 is a flowchart showing the basic operation when picture data from the sub-apparatus 100 are transmitted from the host apparatus 200 to the outside.

Picture data from the sub-apparatus 100 to the host apparatus 200 are subjected to low-speed data transfer of about 2400 bps or 4800 bps (S1). This is for the purpose of preventing mistransfer due to noise since data transfer between the sub-apparatus 100 and the host apparatus 200 is performed using cordless communication.

That is, the MPU 7 performs low-speed modulation of picture data read by the reading unit 11, and transmits the modulated data via the transmission unit 3, the duplexer 2 and the antenna 1.

The MPU 27 of the host apparatus 200 receives the low-speed data transmitted from the sub-apparatus 100 via the antenna 21, the duplexer 22 and the reception unit 24, demodulates the received data by the modem 26, and stores the demodulated data in the memory 34 (S2). It is assumed that the data are encoded by the MPU 7 of the sub-apparatus 100.

If there is any call reception while storing the data in the memory 34, the host apparatus 200 records a reception image in the recording unit 36 in parallel with the data storage.

When the storage of the picture data has been completed (S3), the host apparatus 200 transmits a dial signal corresponding to a dial number via the telephone line 32 by controlling the NCU 31. This dial number has been transferred from the sub-apparatus 100 to the host apparatus 200 at a low speed before the low-speed transfer of the picture data, and has been stored in the memory 34 of the host apparatus 200. If the dial number has been transmitted from the sub-apparatus 100 in the form of an abbreviated code, the host apparatus 200 decodes the abbreviated code. After connected to the called party, the host apparatus 200 performs communication of the stored picture data at a high speed, for example, of 9600 bps (S4).

That is, after the detection of a response from the called party, or after the lapse of a predetermined time period from the transmission of the dial signal, the MPU 27 of the host apparatus 200 reads the picture data from the memory 34, modulates the data at a high speed by the modem 30, and transmits the modulated data at a high speed via the the NCU 31 and the telephone line 32.

The present invention is not limited to a cordless facsimile apparatus, but may be widely applied to any communication system which performs cordless data communication between a host apparatus and a sub-apparatus.

Figure 3:
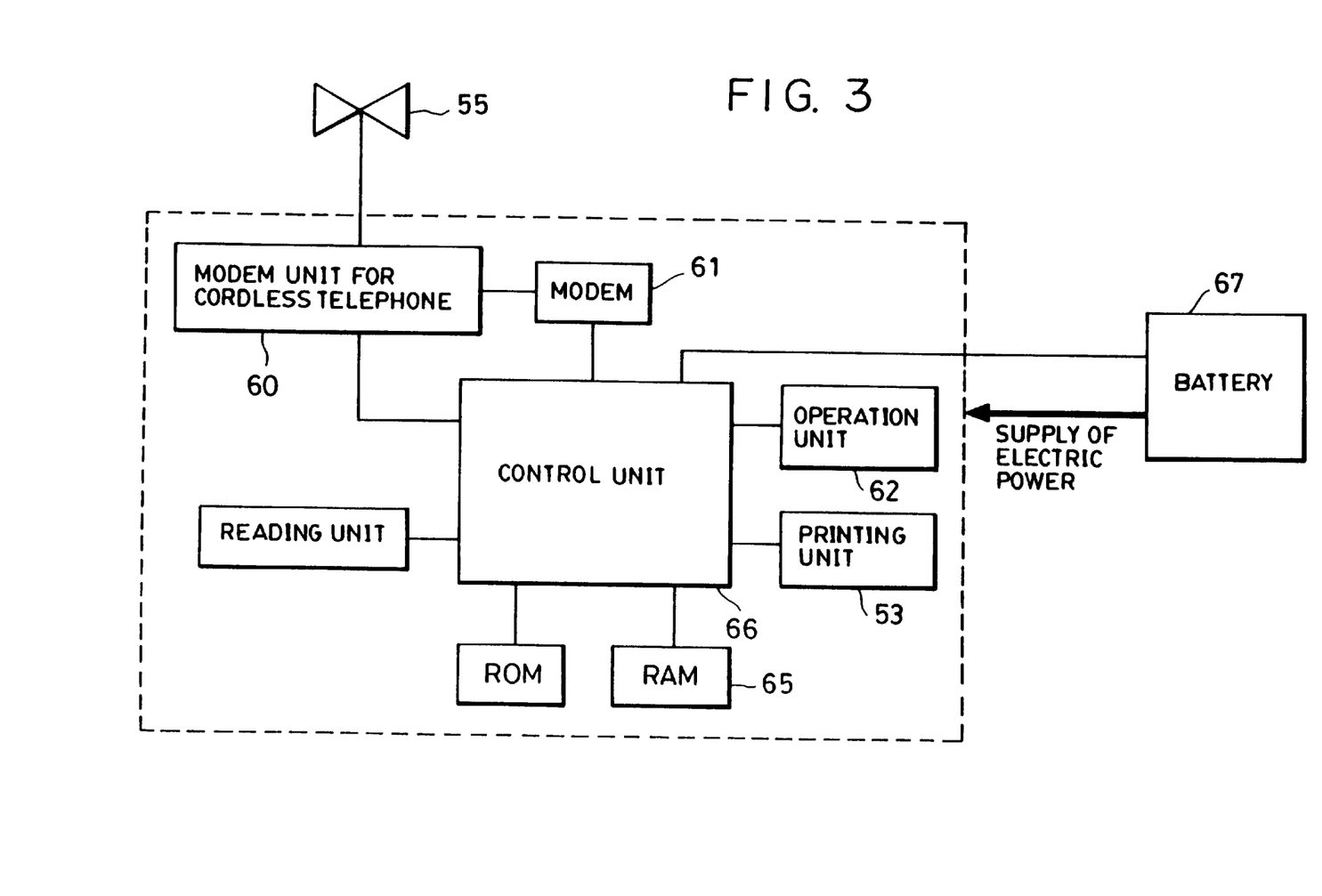
FIG. 3 is a block diagram of a cordless facsimile apparatus, serving as a sub-apparatus, of a second embodiment of the present invention.

FIG. 3 is a block diagram showing the configuration of a cordless facsimile apparatus (sub-apparatus) of a second embodiment of the present invention. In FIG. 3, facsimile communication is performed via a modem unit 60 for a cordless telephone from a modem 61. An operation unit 62 performs the operation of the facsimile apparatus. A RAM 65 is utilized as a work area, an image memory or the like. A control unit 66, serving as a main control unit of the facsimile apparatus, comprises a microprocessor and the like. A battery 67 supplies the portion of the apparatus enclosed by broken lines with electric power. For the convenience of explanation, it is assumed that the generation of strobe signals for a thermal print head and the drive of a recording motor are performed by a printing unit 53.

Figure 4:
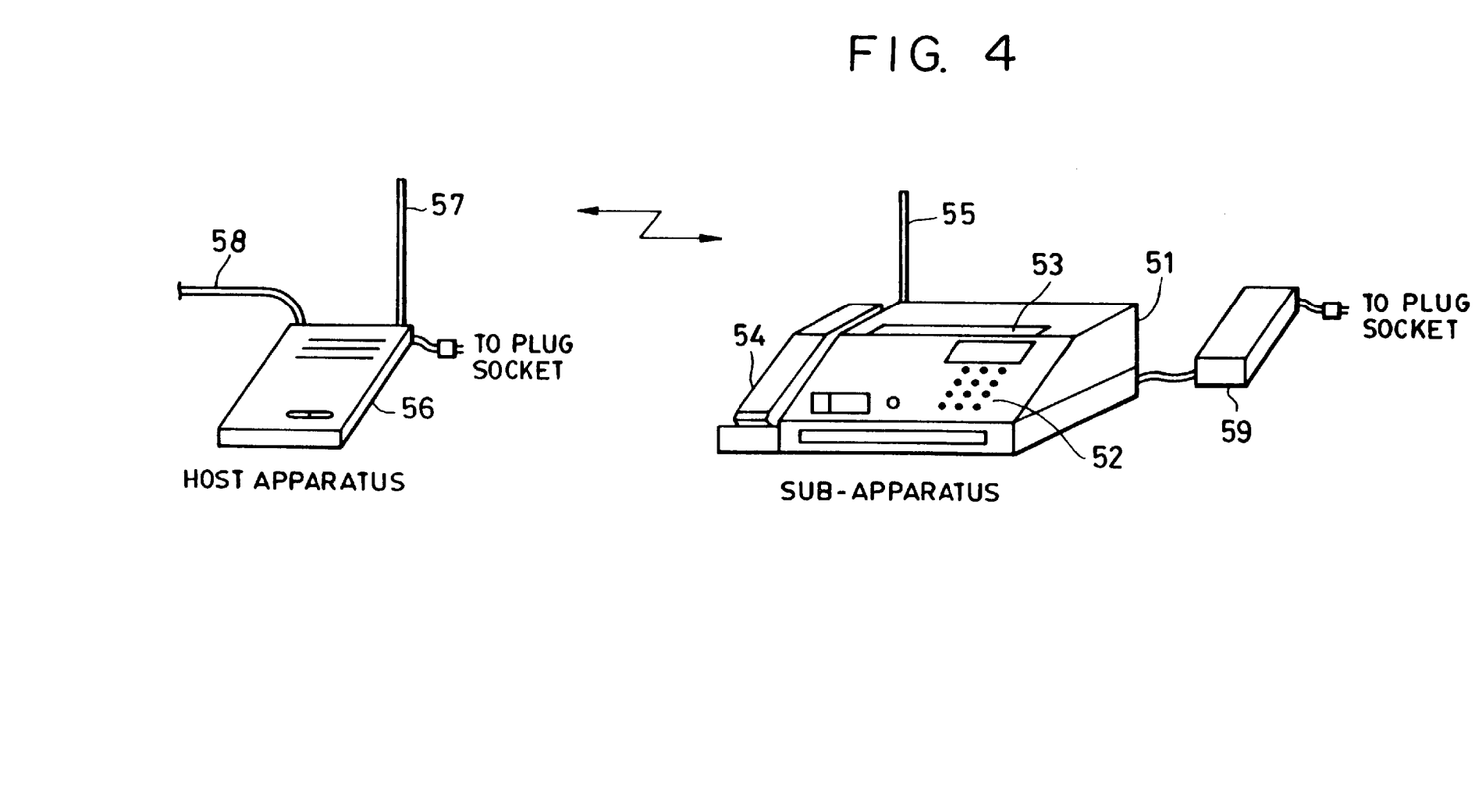
FIG. 4 is a perspective view of a cordless facsimile system of the second embodiment.

FIG. 4 is a perspective view of the entire cordless facsimile system of the present embodiment. In FIG. 4, a facsimile apparatus 51 serves as a sub-apparatus. A ten-key 52 on an operation panel is used when performing calling from the facsimile apparatus. A printing unit 53 is used for a received original. A handset 54 is used for conversation. There is also shown a host apparatus 56 of a cordless telephone system. A modular cord 58 connects a public telephone line to the host apparatus 56. Antennas 55 and 57 are for performing radio communication between the host apparatus and the sub-apparatus.

Electric power is individually supplied from a commercial AC power source to the host apparatus and the sub-apparatus. The sub-apparatus has the built-in battery 67, and can be carried after disconnecting an AC adapter 59.

Figure 5:
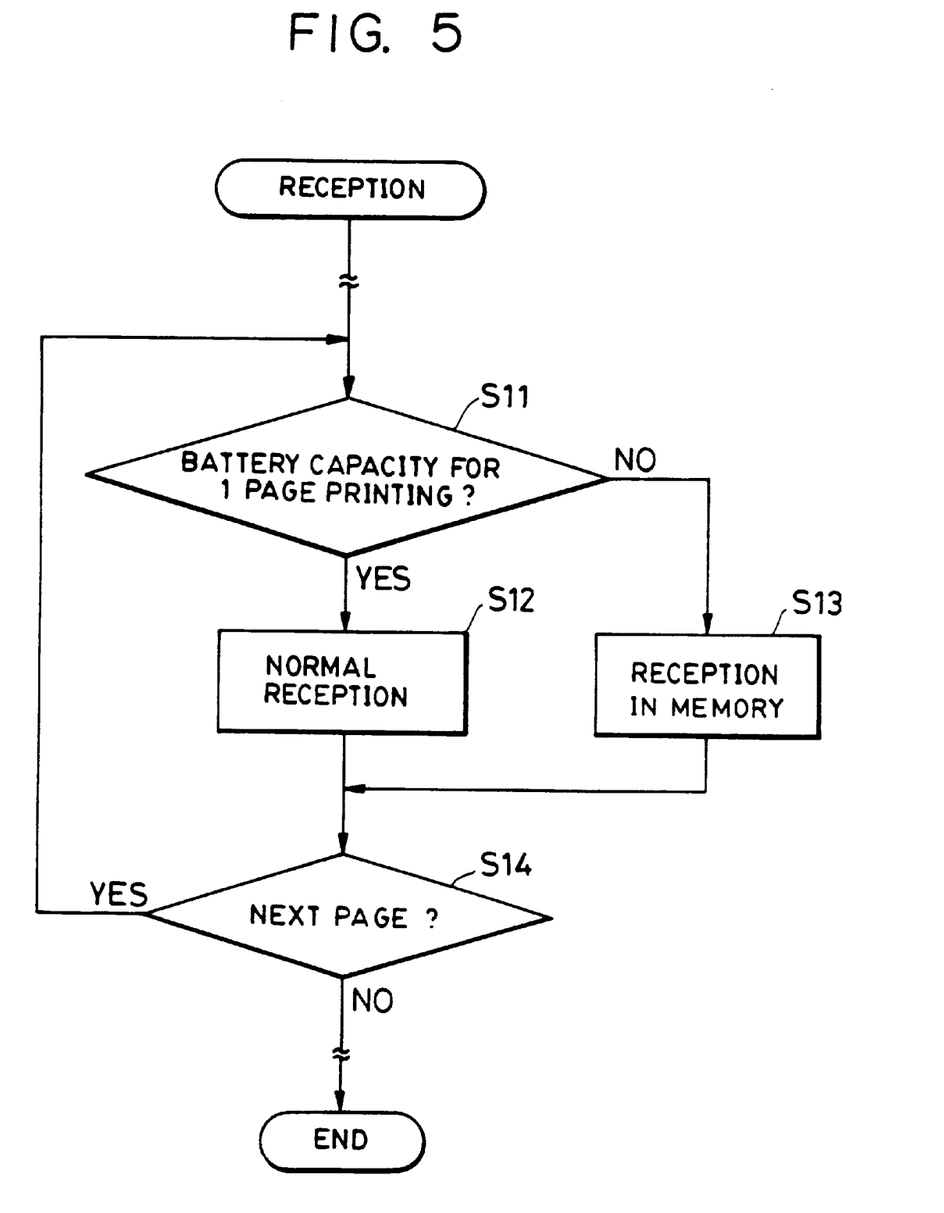
FIG. 5 is a flowchart of the operation of the sub-apparatus of the second embodiment.

The operation of the present embodiment will now be explained according to an operation flowchart shown in FIG. 5. In FIG. 5, the preprocedure and postprocedure for facsimile reception are omitted, and only the flow for image reception is shown.

As shown in FIG. 5, the control unit 66 checks the capacity of the battery 67 before image reception, and determines whether or not the capacity of electric power sufficient for printing one page remains (S11).

If the result of the determination at step S11 is affirmative, the control unit 66 performs normal reception via the modem unit 60 for the cordless telephone and the modem 61, and performs printing on recording paper using the printing unit 53. If the result of the determination at step S11 is negative, the control unit 66 performs reception in the RAM 64 via the modem unit 60 for the cordless telephone and the modem 61. After receiving one page, the control unit 66 determines whether or not the next page is present. If the result of the determination is affirmative, the process returns to step S11. If the result of the determination is negative, the reception operation is terminated.

The capacity of electric power for one page as the basis of the determination whether or not printing for one page can be performed may be set after experimentally or theoretically obtaining a value so as to be able to securely record an image of one page.

The present invention is not limited to a cordless facsimile apparatus, but may also be applied to a facsimile or a printer connected with a wire, or a cordless printer, provided that the apparatus incorporates a battery.

An explanation will now be provided of a third embodiment of the present invention.

FIGS. 3 and 4 are commonly used as a block diagram of a sub-apparatus and a perspective view of the entire system of the present embodiment, respectively.

Figure 6:
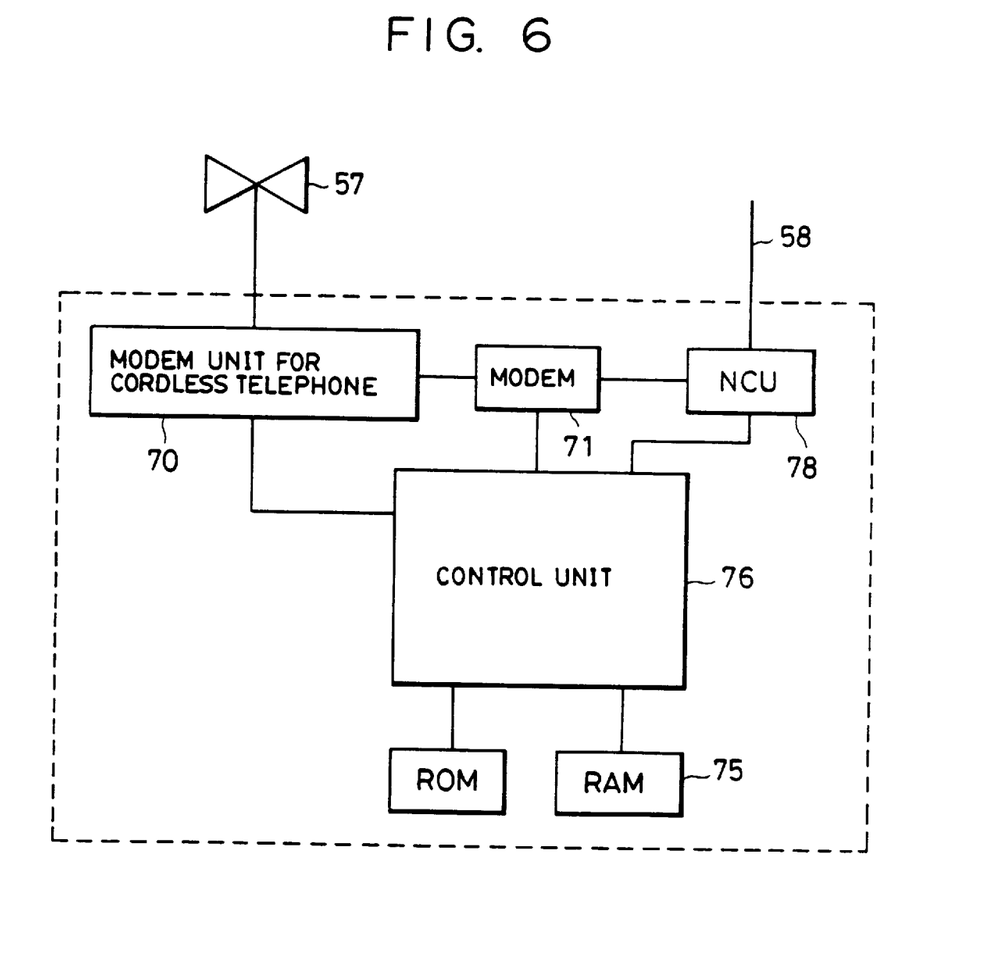
FIG. 6 is a block diagram of a cordless host apparatus of a third embodiment of the present invention.

FIG. 6 is a block diagram of a host apparatus of the present embodiment. In FIG. 6, there are shown an antenna 57, a modular cord 58 connected to a telephone line, a modem unit 70 for a cordless telephone, a modem 71 for a facsimile, a RAM 75, a control unit 76, and a network control unit (NCU) 78.

Figure 7:
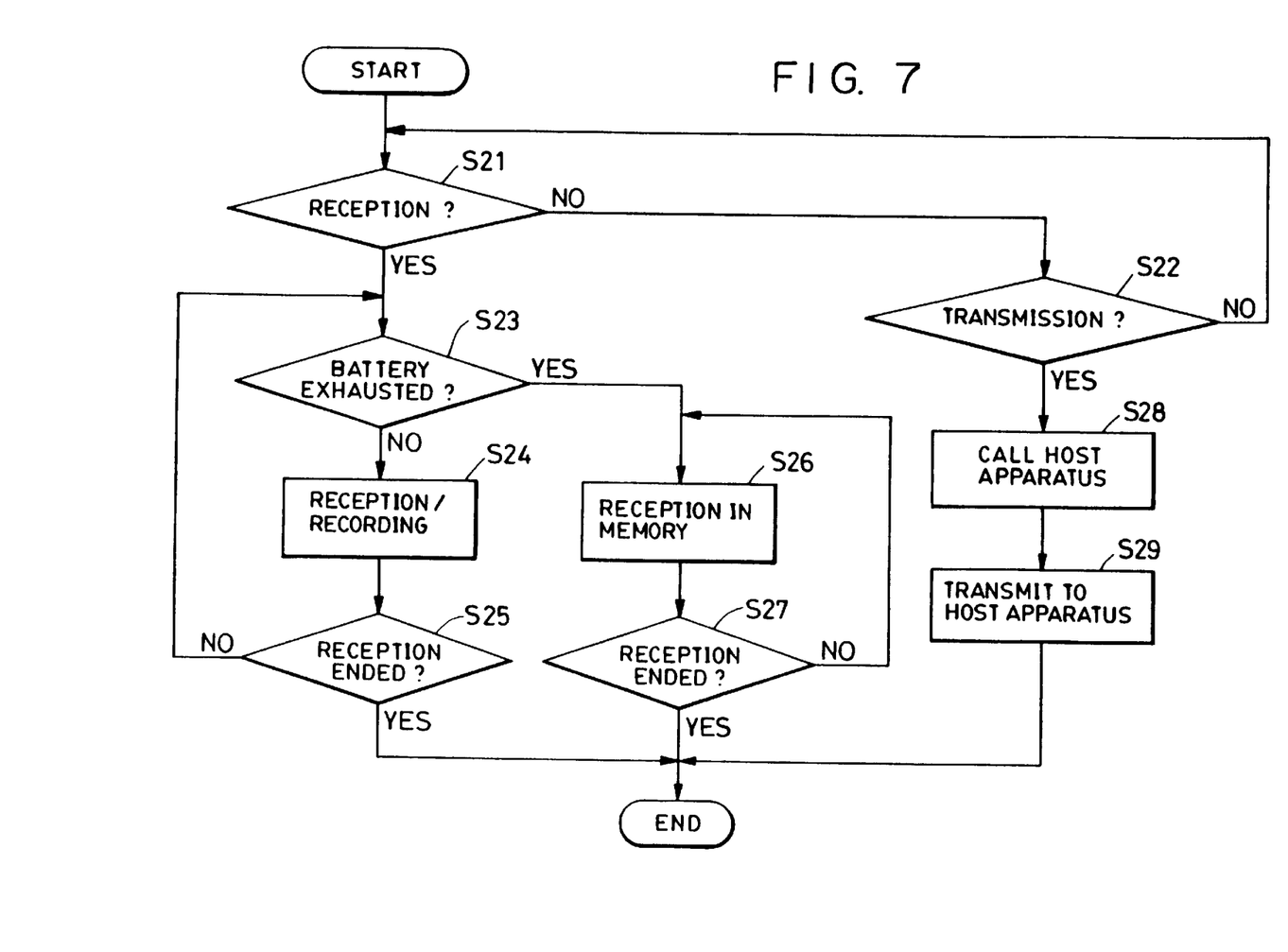
FIG. 7 is a flowchart of the operation of a sub-apparatus of of the third embodiment.

FIG. 7 shows the operation of the cordless facsimile apparatus (sub-apparatus) of the present embodiment.

The control unit 66 of the sub-apparatus 51 determines whether or not call reception from the host apparatus is present (S21), and whether or not facsimile transmission is indicated from the operation unit 62 (S22). If the result of the determination at step S21 is affirmative, the control unit 66 determines the remaining capacity of the battery 67 (S23). If a capacity sufficient for recording remains, while performing recording of a received image using the printing unit 53 via the modem unit 60 for the cordless telephone and the modem 61 for the facsimile (S24), the control unit 66 performs the determination of the end of reception (S25), and the determination of the remaining capacity of the battery (S23).

In call reception, if the remaining capacity of the battery 67 is small, the control unit 66 does not perform recording of the received image by the printing unit 53, but performs reception in the RAM 65 until the end of the reception (S26 and S27).

If the remaining capacity of the battery 67 becomes small during reception/recording at step S24, the control unit 66 interrupts the recording of the received image by the printing unit 53, and performs reception in the RAM 65 (S26).

On the other hand, when transmission has been indicated at step S22, the control unit 66 transmits a telephone number input from the operation unit 62 to the host apparatus 56 from the modem unit 60 for the cordless telephone via the antenna 55 (S28). The control unit 66 then drives the reading unit 63, and transmits a read image signal to the host apparatus via the modem 61 for the facsimile, the modem unit 60 for the cordless telephone, and the antenna 55 (S29).

Figure 8:
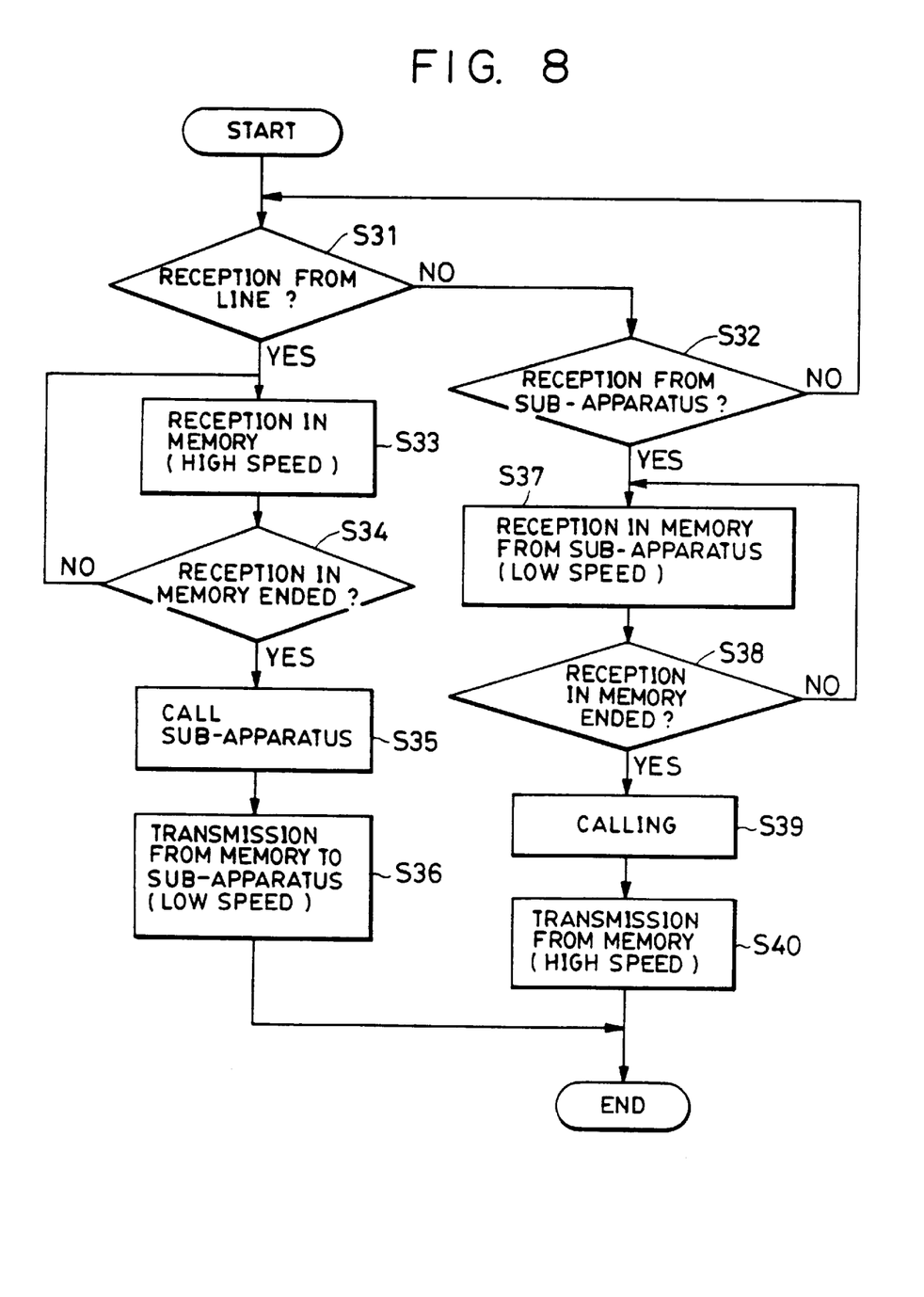
FIG. 8 is a flowchart of the operation of the host apparatus of the third embodiment.

FIG. 8 shows the operation of the host apparatus 56 of the cordless telephone system.

The control unit 76 of the host apparatus 56 determines whether or not call reception from the line 58 is present (S31), and whether or not call reception from the sub-apparatus 51 is present (S32). If the result of the determination at step S31 is affirmative, the control unit 76 communicates procedure signals via the modem 71 for the facsmile, and determines the data communication speed. Subsequently, the control unit 76 demodulates a received facsimile image signal by the modem 71, and writes the demodulated signal in the RAM 75 (S33).

When the reception in the memory has ended (S34), the control unit 76 calls the sub-apparatus 51 via the modem unit 70 for the cordless telephone, and the antenna 57 (S35). When the sub-apparatus 51 has responded, the control unit 76 reads the received image data from the RAM 75, demodulates the read data again into a facsimile signal by the modem 71, demodulates the facsimile signal into a radio signal by the modem unit 70 for the cordless telephone, and transmits the radio signal to the sub-apparatus via the antenna 57 (S36). In parallel with the reception in the memory from the line 58, data may be transmitted to the sub-apparatus 51 at a low speed.

The sub-apparatus 51 prints the received image at steps after S23 shown in FIG. 7.

If the wire telephone network between the transmission side and the host apparatus 56 is compared with the radio network between the host apparatus 56 and the sub-apparatus 51, the wire telephone network has better network quality, and can therefore perform data communication at a higher speed. Accordingly, in the present embodiment, communication from the transmission side to the host apparatus 56 at S33 is performed at a high speed, and communication from the host apparatus 56 to the sub-apparatus 51 is performed at a low speed. Hence, it is possible to economize the tariff of conversation and to obtain a received image having high picture quality.

If there is call reception from the sub-apparatus 51 at S32, the control unit 76 demodulates a telephone number transmitted from the sub-apparatus 56 by the modem unit 70 for the cordless telephone, and writes the number in the RAM 75. The control unit 76 also demodulates a facsimile image signal transmitted from the sub-apparatus 56 via the antenna 57, the modem unit 70 for the cordless telephone, and the modem 71 for a facsimile, and receives the demodulated signal in the RAM 75 (S37).

When the reception in the memory of the facsimile image signal from the sub-apparatus 51 has ended, the control unit 76 reads the telephone number received from the sub-apparatus 51 from the RAM 75, and performs calling by controlling the NCU 78 (S39). When the called party has responded, the control unit 76 modulates the facsimile image signal received from the sub-apparatus 51 by the modem 71, and transmits the the modulated signal via the NCU 78 (S46).

Also in this transmission, communication from the sub-apparatus 51 to the host apparatus 56 is performed at a low speed, and communication from the host apparatus 56 to the called party is performed at a high speed. Hence, it becomes possible to perform image transmission which is inexpensive and has high picture quality.

In S24 shown in FIG. 7, while recording the received image by the printing unit 53, the latest received image for one page may be stored in the RAM 65. If an insufficient capacity of the battery 67 is detected in the course of recording (S23), the recording of the received image by the printing unit 53 is interrupted, but the storage of the received image in the RAM 65 is continued. Subsequently, if the battery 67 is charged, or electric power is supplied via the AC adapter 59, the control unit 66 reads the image stored in the RAM 65 from the head of the page recording of which has been interrupted, and performs recording by the printing unit 53.

According to such arrangement, when recording is interrupted at a midsection of a page, storage in the memory can be performed from the head of the interrupted page.

A fourth embodiment of the present invention will now be explained.

In the present embodiment, reception is refused when the capacity of the battery is small.

The configuration of the present embodiment is common to the configuration shown in FIGS. 3 and 4, but the capacity of the RAM 65 may be smaller than the capacity in the first embodiment.

Figure 9:
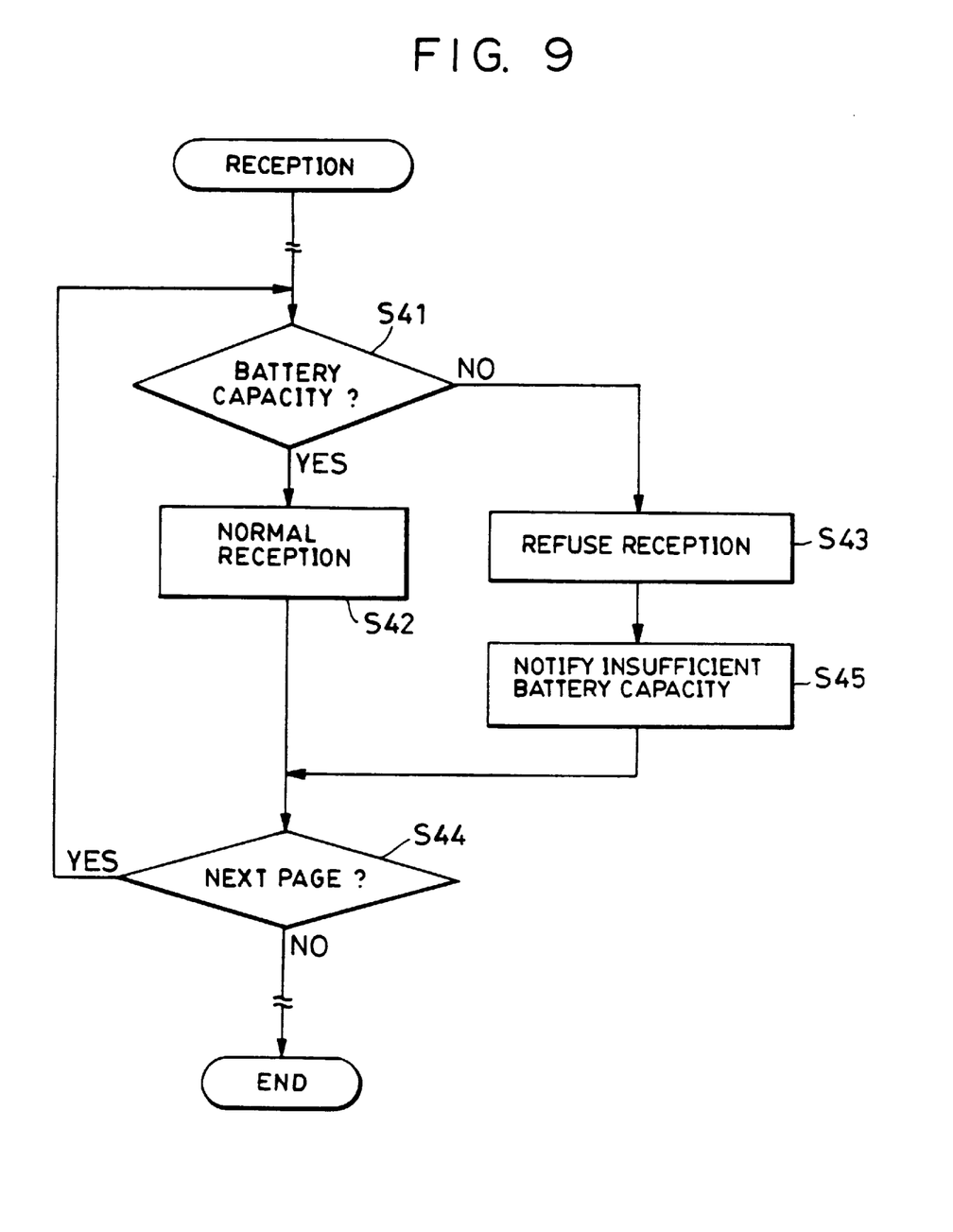
FIG. 9 is a flowchart of the operation of a sub-apparatus of a fourth embodiment.

FIG. 9 shows the operation of the present embodiment.

When the reception of an image signal is requested, the control unit 66 checks the capacity of the battery 67 (S41). If the capacity is insufficient, the control unit 66 refuses the reception of the image signal (S43), and notifies the operator that the remaining capacity of the battery 67 is small by means of voice or visual display using a speaker or a display on the operation unit 62 (S45).

If the capacity of the battery 67 has at least a predetermined value, the control unit 66 notifies the transmission side of the reception of the image signal, and performs image recording according to the transmitted image signal by the printing unit 53 (S42). If the next page is to be transmitted (S44), the control unit 66 checks again the capacity of the battery 67 (S41). If the capacity of the battery 67 is less than the predetermined value, the control unit 66 refuses the reception of the page (S43), and notifies the operator the fact (S45).

After the start of recording, the control unit 66 may detect the remaining capacity of the battery 67 while performing recording. If the capacity becomes less than the predetermined value, the control unit 66 may refuse the reception of the next page when the recording of the current page has ended.

Alternatively, recording may be interrupted in a midsection of the current page.

As described above, in the present embodiment, by refusing the reception of an image before the capacity of the battery expires, the operator is notified of the capacity of the battery so that the operator can charge the battery or connect the AC adapter, and resume the reception at an early stage.

In still another embodiment, at step S45, the host apparatus is notified that the remaining capacity of the battery is small, and the host apparatus supplies an alarm to announce the fact. That is, the control unit 76 of the host apparatus notified from the sub-apparatus that the remaining capacity of the battery is small sounds a buzzer (not shown).

While the present invention has been described with respect to what is presently considered to be the preferred embodiments, it is understood that the invention is not limited to the configuration of the above-described embodiments, but various changes and modifications may be made within the spirit and scope of the appended claims.

What is claimed is:

1. A data receiving apparatus, comprising:
   a recording unit for recording received image data on a recording medium;
   a memory for storing the received data;
   a battery for supplying said recording unit and said memory with electric power;
   monitoring means for monitoring a remaining battery capacity, that is sufficient to complete a recording operation for a single sheet of recording medium by said recording unit; and
   control means for automatically stopping the recording operation to store the received data in said memory by determining, based on the monitoring by said monitoring means, that the remaining battery capacity is not sufficient to complete the recording operation for a single sheet of recording medium by said recording unit.

2. A data receiving apparatus according to claim 1, wherein said control means makes said recording unit record the received data stored in said memory in response to said battery being charged or in response to electric power been supplied from outside.

3. A data receiving apparatus, comprising:
   receiving means for receiving transmitted data in page units;
   a recording unit for recording received data on recording paper;
   a battery for supplying at least said recording unit with electric power;
   detecting means for detecting a remaining battery capacity that is not sufficient to carry out a recording operation by said recording unit; and
   refusing means for completing recording of a current page of data by said recording unit and for refusing reception of a next page of data by said receiving means when said detecting means detects that the remaining battery capacity is not sufficient to carry out the recording operation by said recording unit.

4. A data receiving apparatus according to claim 3, further comprising warning means for warning when the remaining battery capacity is not sufficient to carry out the recording operation by said recording unit.

5. A data receiving apparatus according to claim 4, wherein said warning means warns when the remaining battery capacity is not sufficient to carry out the recording operation of a page of an image of said recording unit.

6. A data receiving apparatus comprising:
   radio receiving means for radio-receiving transmitted data in page units;
   a recording unit for recording radio-received data on recording paper;
   a battery for supplying at least said recording unit with electric power;
   detecting means for detecting a remaining battery capacity that is not sufficient to carry out a recording operation by said recording unit; and
   refusing means for completing recording of a current page of data by said recording unit and for refusing reception of a next page of data by said receiving means when said detecting means detects that the remaining battery capacity is not sufficient to carry out the recording operation by said recording unit.

7. A data receiving apparatus according to claim 6, further comprising warning means for warning when the remaining battery capacity is not sufficient to carry out the recording operation by said recording unit.

8. A data radio receiving apparatus according to claim 7, wherein said warning means warns when the remaining battery capacity is not sufficient to carry out the recording.

9. A data radio-receiving apparatus, comprising:
  a recording unit for recording radio-received data on a recording medium;
  a memory for storing the radio-received data;
  a battery for supplying said recording unit and said memory with electric power;
  monitoring means for monitoring a remaining battery capacity that is sufficient to complete a recording operation for a single sheet of recording medium by said recording unit; and
  control means for automatically slopping the recording operation to store the received data in said memory by determining, based on the monitor by said monitoring means, that the remaining battery capacity is not sufficient to complete the recording operation for a single sheet of recording medium by said recording unit.

10. A data radio receiving apparatus according to claim 9, wherein said control means makes said recording unit record the received data stored in said memory in response to said battery being charged or in response to electric power being supplied from outside.

11. A controlling method in a data receiving apparatus comprising the steps of:
  monitoring a remaining battery capacity that is sufficient to carry out a recording operation of received data on a recording medium;
  determining that the remaining battery capacity is not sufficient to complete the recording operation for a single sheet of recording medium; and
  automatically stopping the recording operation to store the received data in said memory when the remaining battery capacity is not sufficient to complete the recording operation for a single sheet page of recording medium.

12. A controlling method according to claim 11, further comprising the step of recording the received data stored in the memory on the recording medium when the battery is charged or supplied with electric power from outside.

13. A controlling method in a data radio receiving apparatus comprising the steps of:
  monitoring the remaining battery capacity, that is sufficient to carry out a recording operation of radio-received data on a recording medium;
  determining that the remaining battery capacity is not sufficient to complete the recording operation for a single page of recording medium; and
  automatically stopping the recording operation to store the radio-received data in said memory when the remaining battery capacity is not sufficient to complete the recording operation for a single sheet of recording medium.

14. A controlling method in a data receiving apparatus, comprising the steps of:
  detecting a remaining battery capacity that is not sufficient to carry out a recording operation of received data received in page units; and
  completing recording of a current page of data and refusing reception of data of a next page of data when it is detected that the remaining battery capacity is not sufficient to carry out the recording operation for the current page of data in said detecting step.

15. A controlling method according to claim 14, further comprising the step of warning when the remaining battery capacity is not sufficient to carry out the recording operation.

16. A controlling method according to claim 15, wherein, in said warning step, a warning operation is performed when the remaining battery capacity is not sufficient to carry out the recording operation of a page of data.

17. A controlling method according to claim 14, wherein the data is received by radio.

* * * * *

UNITED STATES PATENT AND TRADEMARK OFFICE
CERTIFICATE OF CORRECTION

PATENT NO. : 6,144,725
DATED : November 7, 2000
INVENTOR(S) : Yuji Kurosawa et al.

It is certified that error appears in the above-identified patent and that said Letters Patent is hereby corrected as shown below:

Column 2,
Line 21, "of of" should read -- of --; and
Line 66, "acess" should read -- access --.

Column 3,
Line 17, "RAN" should read -- RAM --; and
Line 24, "MPU" should read -- the MPU --.

Column 4,
Line 19, "connected" should read -- connecting --.

Column 7,
Line 8, "of" (second occurrence) should be deleted;
Line 11, "such" should read -- such an --; and
Line 40, "the" should read -- of the --.

Column 8,
Line 2, "been" should read -- being --;
Line 49, "receiving" should read -- radio-receiving --;
Line 50, "radio receiving" should read -- radio-receiving --; and
Line 49, "receiving" should read -- radio-receiving --.

Column 9,
Line 3, "radio receiving" should read -- radio-receiving --; and
Line 23, "radio receiving" should read -- radio-receiving --.

UNITED STATES PATENT AND TRADEMARK OFFICE
CERTIFICATE OF CORRECTION

PATENT NO.   : 6,144,725
DATED        : November 7, 2000
INVENTOR(S)  : Yuji Kurosawa et al.

It is certified that error appears in the above-identified patent and that said Letters Patent is hereby corrected as shown below:

Column 10,
Line 5, "radio receiving" should read -- radio-receiving --.

Signed and Sealed this

Sixteenth Day of October, 2001

Attest:

*Nicholas P. Godici*

*Attesting Officer*

NICHOLAS P. GODICI
*Acting Director of the United States Patent and Trademark Office*